(12) United States Patent
Zhang et al.

(10) Patent No.: US 11,132,576 B2
(45) Date of Patent: Sep. 28, 2021

(54) TEXT RECOGNITION METHOD AND APPARATUS, ELECTRONIC DEVICE, AND STORAGE MEDIUM

(71) Applicant: AInnovation (Shanghai) Technology Co., Ltd., Shanghai (CN)

(72) Inventors: Faen Zhang, Shanghai (CN); Qiang Lu, Shanghai (CN); Zhichao Yuan, Shanghai (CN); Tianqi Sun, Shanghai (CN); Hui Xu, Shanghai (CN)

(73) Assignee: AInnovation (Shanghai) Technology Co., Ltd., Shanghai (CN)

( * ) Notice: Subject to any disclaimer, the term of this patent is extended or adjusted under 35 U.S.C. 154(b) by 0 days.

(21) Appl. No.: 16/901,154

(22) Filed: Jun. 15, 2020

(65) Prior Publication Data
US 2021/0264189 A1 Aug. 26, 2021

(30) Foreign Application Priority Data
Feb. 24, 2020 (CN) .......................... 202010114235.9

(51) Int. Cl.
*G06K 9/32* (2006.01)
*G06K 9/46* (2006.01)

(52) U.S. Cl.
CPC .............. *G06K 9/325* (2013.01); *G06K 9/46* (2013.01); *G06K 2209/01* (2013.01)

(58) Field of Classification Search
None
See application file for complete search history.

(56) References Cited

U.S. PATENT DOCUMENTS

2013/0148857 A1* 6/2013 Yoon .................... G06K 9/3258
382/105
2017/0109576 A1* 4/2017 Shustorovich .......... G06T 7/187

* cited by examiner

*Primary Examiner* — Edward Park
(74) *Attorney, Agent, or Firm* — Ziegler IP Law Group, LLC

(57) ABSTRACT

A text recognition method, a text recognition apparatus, an electronic device, and a storage medium are provided. The method includes: extracting character prediction regions of a text line image using a constructed text recognition model, to obtain a character region set; calculating horizon-distance IOUs between the character prediction regions in the character region set according to a position of each character prediction region in the character region set; removing overlapped character prediction regions from the character region set, according to the horizon-distance IOUs between the character prediction regions in the character region set, to obtain a character position set; and sorting and outputting character categories corresponding to the character prediction regions in the character position set according to positions of the character prediction regions in the character position set.

17 Claims, 5 Drawing Sheets

TEXT RECOGNITION METHOD AND APPARATUS, ELECTRONIC DEVICE, AND STORAGE MEDIUM

CROSS-REFERENCE TO RELATED APPLICATIONS

The present application claims priority of Chinese Patent Application No. 202010114235.9, entitled "Text Recognition Method and Apparatus, Electronic Device, and Storage Medium" and filed with the Chinese Patent Office on Feb. 24, 2020, the contents of which are incorporated herein by reference in their entirety.

TECHNICAL FIELD

The present disclosure relates to the technical field of image processing, in particular to a text recognition method, a text recognition apparatus, an electronic device, and a storage medium.

BACKGROUND ART

The text recognition generally refers to a process of performing recognition and analysis processing on a text image to acquire useful information on characters in a character image. Common fields of text recognition include identification card recognition, invoice recognition, automobile VN code recognition, and vehicle license plate recognition, and demands for text recognition in industrial scenes are also increasing, for example, recognition of workpiece codes and matching of workpiece serial numbers. The working conditions of text recognition are increasingly complex, which also poses higher and higher requirement on a text recognition algorithm.

Existing picture processing and recognition mainly adopts a conventional text detection and recognition technology (Optical Character Recognition, OCR), and when recognizing a document image captured by a digital camera, the OCR usually has a low recognition rate, and poor recognition accuracy due to distortion of the image.

SUMMARY

An embodiment of the present disclosure provides a text recognition method for improving accuracy of text recognition.

An embodiment of the present disclosure provides a text recognition method, including:

extracting character prediction regions of a text line image using a constructed text recognition model, to obtain a character region set;

calculating horizon-distance IOUs between the character prediction regions in the character region set according to a position of each character prediction region in the character region set;

removing overlapped character prediction regions in the character region set, according to the horizon-distance IOUs between the character prediction regions in the character region set, to obtain a character position set; and sorting and outputting, according to positions of the character prediction regions in the character position set, character categories corresponding to the character prediction regions in the character position set.

An embodiment of the present disclosure provides a text recognition apparatus, including:

a region extraction module, configured to extract character prediction regions of a text line image using a constructed text recognition model, to obtain a character region set;

an IOU calculation module, configured to calculate horizon-distance IOUs between the character prediction regions in the character region set according to a position of each character prediction region in the character region set; an overlap removal module, configured to remove overlapped character prediction regions in the character region set, according to the horizon-distance IOUs between the character prediction regions in the character region set, to obtain a character position set; and a character output module, configured to sort and output character categories corresponding to the character prediction regions in the character position set according to positions of the character prediction regions in the character position set.

An embodiment of the present disclosure further provides an electronic device, wherein the electronic device includes:

a processor; and a memory, configured to store instructions executable by the processor, wherein the processor is configured to execute the above text recognition method.

BRIEF DESCRIPTION OF DRAWINGS

In order to more clearly illustrate technical solutions of embodiments of the present disclosure, accompanying drawings required to be used in the embodiments of the present disclosure will be introduced briefly below.

DETAILED DESCRIPTION OF EMBODIMENTS

The technical solutions in the embodiments of the present disclosure will be described below in conjunction with accompanying drawings in the embodiments of the present disclosure.

Similar reference signs and letters represent similar items in the following accompanying drawings, therefore, once a certain item is defined in one accompanying drawing, it is not needed to be further defined or explained in subsequent accompanying drawings. Meanwhile, in the description of the present disclosure, terms such as "first" and "second" are merely used for distinctive description, and thus should not be construed as indicating or implying importance in the relativity.

Figure 1:
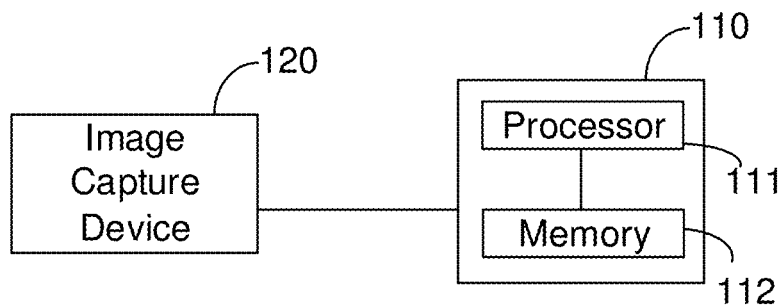
FIG. 1 is a schematic view of an application scenario of a text recognition method provided in an embodiment of the present disclosure.

FIG. 1 is a schematic view of an application scenario of a text recognition method provided in an embodiment of the present disclosure. As shown in FIG. 1, this application scenario includes a smart device 110. The smart device 110 may be a server, a server cluster or a cloud computing center. The smart device 110 further may be a smart camera, a mobile terminal or a desktop computer. The smart device 110 may recognize character contents contained in a text line image using a method provided in an embodiment of the present disclosure.

In an embodiment, the above application scenario may further include an image capture device 120, wherein the image capture device 120 may capture an image containing character contents, and transmit the image to the smart device 110, and text recognition is performed by the smart device 110 using the method provided in the embodiment of the present disclosure.

The present disclosure further provides an electronic device. The electronic device may be the smart device 110 shown in FIG. 1. As shown in FIG. 1, the smart device 110 may include a processor 111 and a memory 112 configured to store instructions executable by the processor 111, wherein this processor 111 is configured to execute the text recognition method provided in the embodiment of the present disclosure.

The memory 112 may be implemented by any type of volatile or non-volatile memory device or combination thereof, for example, a static random access memory ("SRAM" for short), an electrically erasable programmable read-only memory ("EEPROM" for short), an erasable programmable read-only memory ("EPROM" for short), a programmable read-only memory ("PROM" for short), a read-only memory ("ROM" for short), a magnetic memory, a flash memory, a magnetic disk and an optical disk.

The present disclosure further provides a computer-readable storage medium, in which a computer program is stored, and the computer program may be executed by the processor 111 so as to complete the text recognition method provided in the embodiment of the present disclosure.

Figure 2:
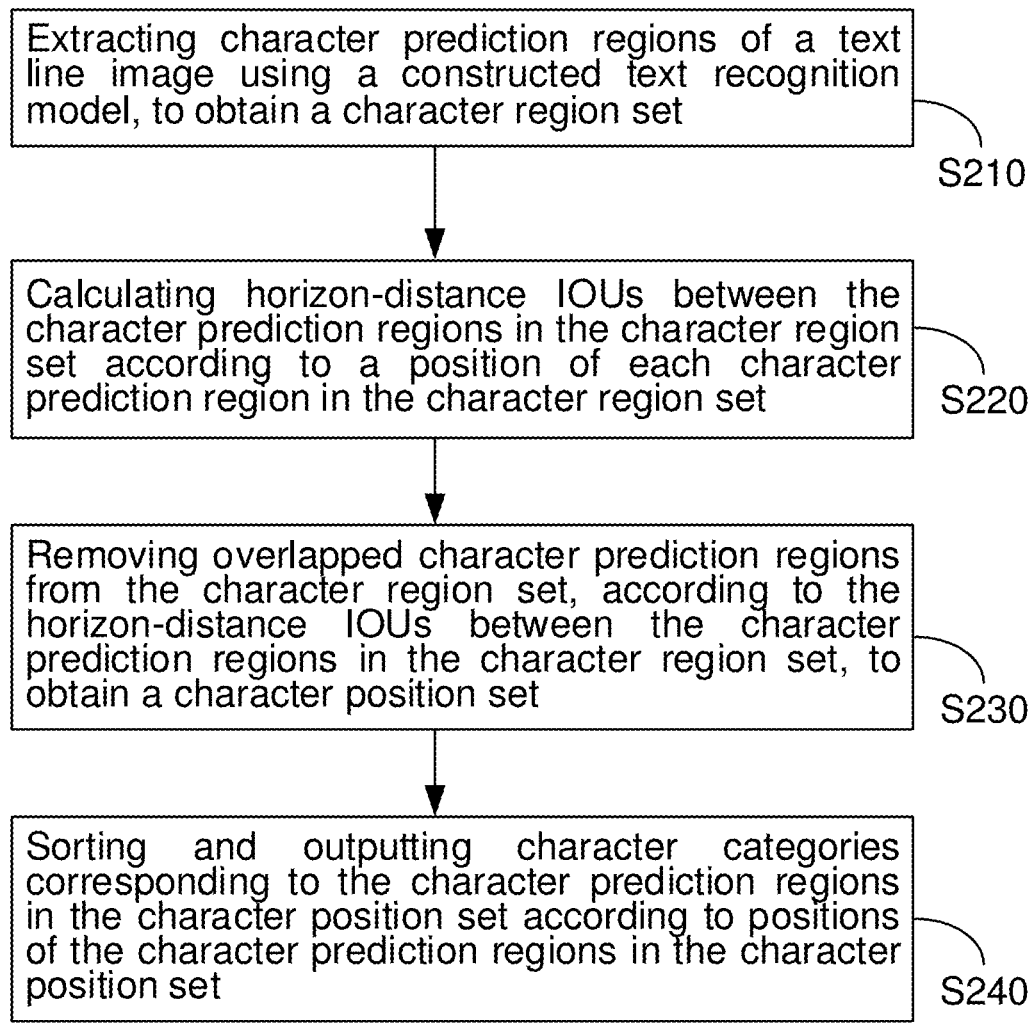
FIG. 2 is a schematic flowchart of the text recognition method provided in an embodiment of the present disclosure.

FIG. 2 is a schematic flowchart of the text recognition method provided in an embodiment of the present disclosure. As shown in FIG. 2, the method includes following steps S210-S240.

Step S210: extracting character prediction regions of a text line image by a constructed text recognition model, to obtain a character region set.

In the above, the text recognition model may be a trained neural network model based on target detection, for example, SSD (Single Shot MultiBox Detector) and YOLOV3 (You Only Look Once Version 3). The input to the text recognition model may be a text line image which may have a size of 88×352. The output of the text recognition model may include character prediction regions, a character category and a classification confidence of each character prediction region. The character prediction region, configured to represent a region where a character is possibly located, may be in a form of rectangular box, coordinates of four vertexes of the rectangular box are used to represent a position of the character prediction region, and a plurality of character prediction regions may be detected at a place of a same character. That is to say, there may be an overlapping phenomenon between the character prediction regions. The character region set refers to a set composed of all character prediction regions.

Weight of classification loss in loss function of the text recognition model may be set to 10 so as to improve character classification accuracy of a detection result of the text recognition model. According to the characteristic that characters in the text line have a substantially consistent size and are horizontally arranged, height of an anchor box (i.e. reference box) is set to be 0.8 times the height of a text line image input.

Step S220: calculating a horizon-distance IOU between the character prediction regions in the character region set according to a position of each character prediction region in the character region set.

Figure 3:
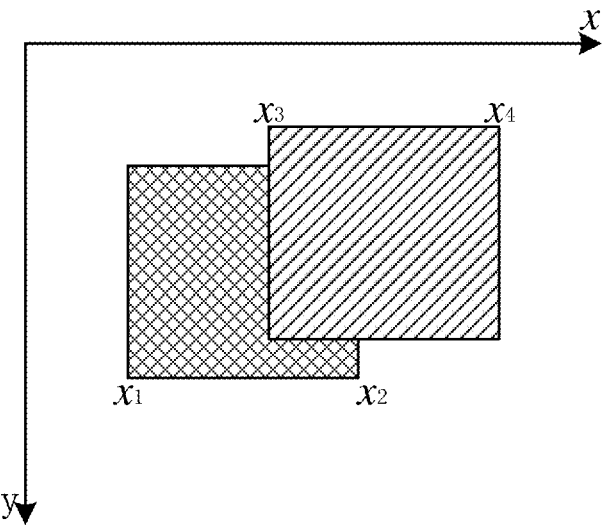
FIG. 3 is a schematic diagram illustrating the principle of calculating a horizon-distance IOU.

FIG. 3 is a schematic diagram illustrating the principle of calculating the horizon-distance IOU (Intersection over Union), and as shown in FIG. 3, there is an overlapping phenomenon between two character prediction regions, and the horizon-distance IOU between the two character prediction regions may be calculated with a following formula:

$$\frac{x_2 - x_3}{x_4 - x_1}.$$

In the above, $x_2$ and $x_1$ represent abscissas of two vertexes of one character prediction region, and $x_3$ and $x_4$ represent abscissas of two vertexes of another character prediction region. The horizon-distance IOU may be used to represent an overlap ratio of the two character prediction regions in a horizontal direction.

The position of each character prediction region may include coordinates of each vertex of the character prediction region. For all the character prediction regions in the character region set, the horizon-distance IOU between any two character prediction regions may be calculated pairwise.

Step S230: removing overlapped character prediction regions in the character region set, according to the horizon-distance IOUs between the character prediction regions in the character region set, to obtain a character position set.

In an embodiment, if the horizon-distance IOU between any two character prediction regions is greater than a second threshold value, the two character prediction regions may be considered having an overlapping phenomenon therebetween. The second threshold value may be 0.3. For example, if a certain character prediction region overlaps two other character prediction regions respectively, for the three character prediction regions, two character prediction regions may be removed therefrom, and the remaining character prediction region is added to the character position set. The character position set may be regarded as a set of remaining character prediction regions that do not overlap after the overlapped character prediction regions are removed.

Step S240: sorting and outputting character categories corresponding to the character prediction regions in the character position set according to positions of the character prediction regions in the character position set.

Generally, characters in a text are horizontally arranged, and the position of each character prediction region may be a value of an abscissa of the character prediction region. For all the character prediction regions in the character position set, the character prediction regions in the character position set may be sorted according to magnitudes of the abscissas of these character prediction regions in an ascending order, and then the character categories corresponding to all the character prediction regions are output in order. In the above, the character categories refer to types of characters contained in the character prediction regions, which may be Chinese characters, letters or specific symbols. For characters vertically arranged, it is also feasible to cut out each column, and take each column as a text line. The order of each character in the text line is distinguished according to magnitudes of the respective abscissas.

The character category of each character prediction region may be recognized by the above text recognition model in step S210. The character category of each character prediction region also may be recognized by the text recognition model after the character position set is determined.

In the technical solution provided in the above embodiment of the present disclosure, the character position set may be obtained from removal of overlapped character prediction regions by calculating the horizon-distance IOUs between the character prediction regions, and the character categories of the character prediction regions may be sorted and output according to the position of each character prediction region in the character position set, so as to obtain a text recognition result. This manner is applicable to recognition of curved text images, can solve the problem of appearances of a plurality of character recognition boxes at the same position, and can improve the accuracy of text recognition.

Figure 4:
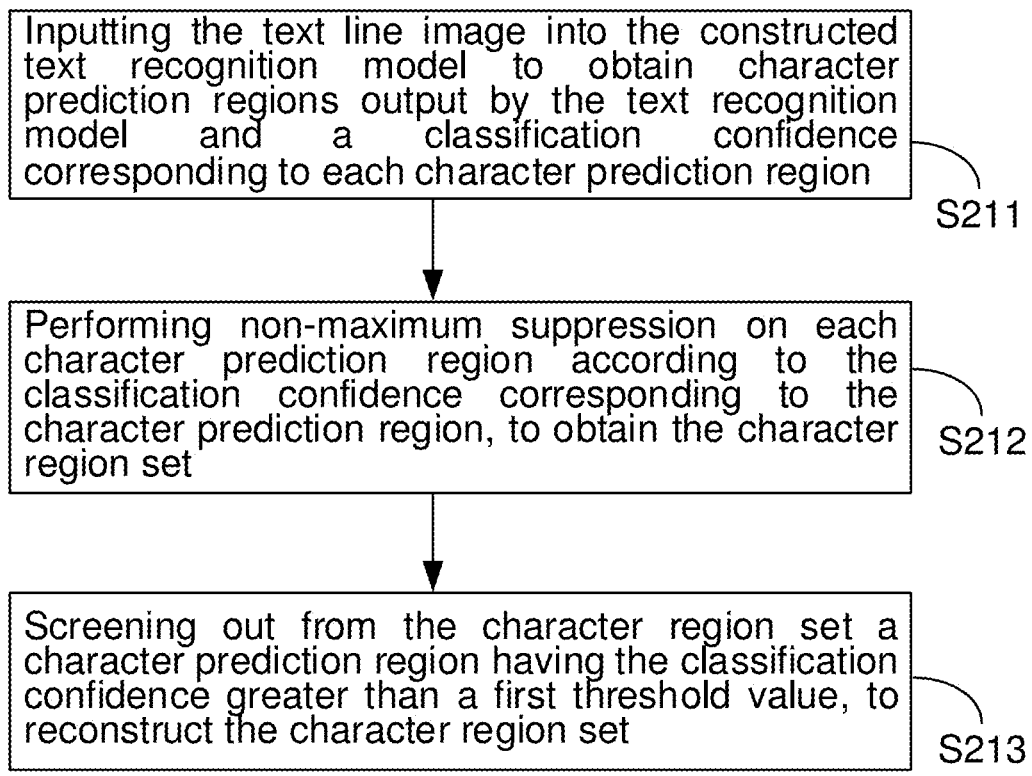
FIG. 4 is a flowchart illustrating step 210 in the embodiment corresponding to FIG. 2.

In an embodiment, as shown in FIG. 4, the above step 210 may include following step 211 and step 212.

Step 211: inputting the text line image into the constructed text recognition model, to obtain character prediction regions output by the text recognition model and a classification confidence corresponding to each character prediction region.

In the above, the classification confidence is configured to represent the classification accuracy of the character category of the character prediction region. The character category and classification confidence may be obtained by the text recognition model in step 210.

Step 212: performing non-maximum suppression on each character prediction region according to the classification confidence corresponding to the character prediction region, to obtain the character region set.

A plurality of character prediction regions may be obtained for one character, the non-maximum suppression refers to selecting a character prediction region having the highest classification confidence, as a character prediction region in a local region, from a plurality of local character prediction regions, and all the character prediction regions screened out at this time may constitute the character region set.

After step 212, the method provided in the embodiment of the present disclosure may further include following step 213: screening out from the character region set one or more character prediction regions each having the classification confidence greater than a first threshold value, to reconstruct the character region set.

For example, the first threshold value may be 0.5, character prediction regions having the classification confidences greater than 0.5 may be screened out from the character region set, and the character prediction regions screened out are used as the character region set.

Figure 5:
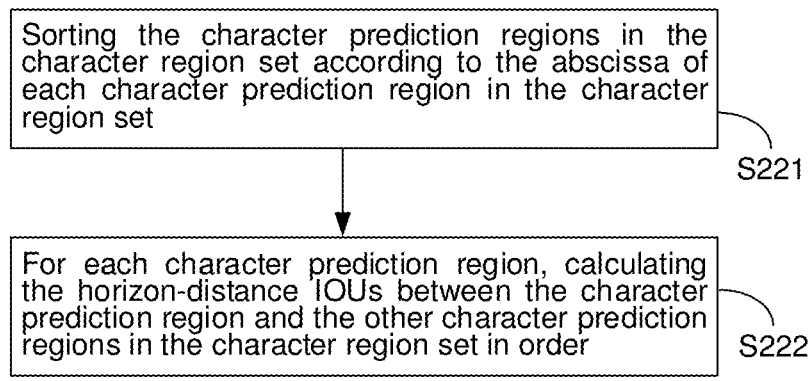
FIG. 5 is a flowchart illustrating step 220 in the embodiment corresponding to FIG. 2.

In an embodiment, as shown in FIG. 5, the above step 220 includes following steps 221-222.

Step 221, the character prediction regions in the character region set are sorted according to the abscissa of each character prediction region in the character region set.

All the character prediction regions in the character region set may be sorted according to the abscissas in an ascending order or in a descending order.

Step 222, calculating in sequence, for each character prediction region, the horizon-distance IOUs between the character prediction region and other character prediction regions in the character region set.

Assume that the character region set is a set 1, the set 1 includes n character prediction regions, based on the above sorting, it is feasible to calculate horizon-distance IOUs between a first character prediction region and each of second to n-th character prediction regions may be respectively calculated pairwise, to find out all character prediction regions overlapping the first character prediction region, and the first character prediction region and the character prediction regions overlapping the first character prediction region are deleted from the set 1, and placed in a set 2, to obtain a new set 1. For a plurality of overlapped character prediction regions in the set 2, one character prediction region may be selected therefrom and placed in a set 3, and the set 2 is set as an empty set. The character prediction regions in the set 3 may be regarded as character prediction regions without overlapping phenomenon.

On the contrary, if the first character prediction region in the set 1 does not overlap any other character prediction regions in the set 1, the first character prediction region may be deleted from the set 1 and placed in the set 3 to obtain a new set 1;

Continuously for the new set 1, horizon-distance IOUs between a first character prediction region and second to last character prediction regions are respectively calculated pairwise, to find out all character prediction regions overlapping the first character prediction region, and the first character prediction region and the character prediction regions overlapping the first character prediction region are deleted from the new set 1 and placed in a set 2, to obtain an updated set 1. And continuously, one character prediction region is selected from the set 2 and placed in a set 3, and the set 2 is set as an empty set.

Such process continues until the set 1 is empty, thus, completing the calculation of the horizon-distance IOUs between all the character prediction regions in the set 1, and the selection of the character prediction regions without overlapping phenomenon. The formula for calculating the horizon-distance IOUs may be referred to the above.

In an embodiment, the above step 230 includes: placing, if all the horizon-distance IOUs between each character prediction region in the character region set and all the other character prediction regions in the character region set are less than or equal to the second threshold value, the character prediction region selected from the character region set into the character position set.

In the above, the character region set may be equivalent to the set 1 in the above embodiment, the character position set may be equivalent to the set 3 in the above embodiment, the second threshold value may be set to be 0.3, and if the horizon-distance IOUs between a certain character prediction region in the set 1 and all the other character prediction regions in the set 1 are less than or equal to 0.3, it may be considered that there is no overlapping phenomenon between this character prediction region and all the other character prediction regions, so that this character prediction region may be placed in the set 3. The character prediction regions in the character position set may be regarded as character prediction regions without overlapping phenomenon.

Optionally, the above step 230 may include: removing, if the horizon-distance IOU between any character prediction region in the character region set and at least one character prediction region in the character region set is greater than the second threshold value, the related character prediction region from the character region set, and placing the related character prediction region in a candidate set; and selecting and adding a character prediction region to the character position set according to classification confidence of each character prediction region in the candidate set.

In the above, the candidate set may be equivalent to the set 2 in the above embodiment, and if the horizon-distance IOU between a certain character prediction region in the set 1 and at least one character prediction region in the set 1 is greater than 0.3, these several character prediction regions having the horizon-distance IOUs therebetween greater than 0.3 may be deleted from the set 1 and placed in the set 2. Among the several character prediction regions in the set 2, i.e., the character prediction regions in the candidate set, two character prediction regions which have the two highest classification confidences may be screened out according to the level of classification confidence. If the difference between classification confidences of two character prediction regions is smaller than a third threshold value (e.g., 0.1), between the two character prediction regions, the character prediction region having the larger area may be added to the character position set (i.e., the set 3).

On the contrary, if the difference between the classification confidences of the two character prediction regions is greater than or equal to the third threshold value, among the two character prediction regions the character prediction region with the larger classification confidence is added to the character position set (i.e., the set 3).

Thus, the character prediction regions in the set 3 may be regarded as character prediction regions without the overlapping phenomenon. All the character prediction regions in the set 3 are sorted, and the character category corresponding to each character prediction region is output according to the sorting result, so that a recognition result can be obtained.

Figure 6:
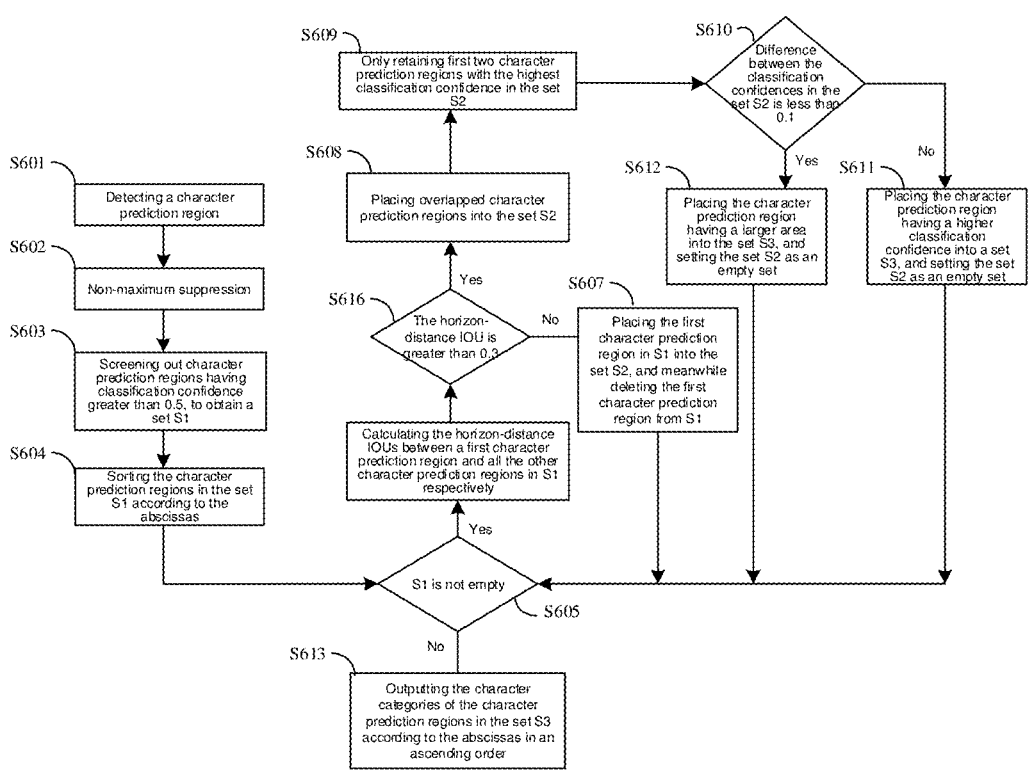
FIG. 6 is a schematic flowchart of the text recognition method provided in another embodiment of the present disclosure.

FIG. 6 is a schematic flowchart of the text recognition method provided in an embodiment of the present disclosure, and as shown in FIG. 6, this method includes following steps:

step 601, inputting an image to obtain a character prediction region by a text recognition model;

step 602, performing non-maximum suppression (NMS) on the character prediction region to obtain a character region set S0;

step 603, screening out character prediction regions having classification confidence greater than 0.5 from the character region set S0, to obtain a character region set S1;

step 604, sorting the character prediction regions in the character region set S1 according to the abscissas in an ascending order;

step 605, judging whether the character region set S1 is empty, wherein if the character region set S1 is not empty, horizon-distance IOUs between a first character prediction region in the character region set S1 and all the remaining character prediction regions in S1 are calculated respectively, and if the character region set S1 is empty, step 613 is performed;

step 606, judging whether the horizon-distance IOU is greater than 0.3, wherein if not, step 607 is performed, and if yes, step 608 is performed;

step 607, placing the first character prediction region in the character region set S1 into the character position set S3, and meanwhile deleting the first character prediction region from the character region set S1, and returning to step 605;

step 608, placing the first character prediction region and the character prediction regions which have the horizon-distance IOUs of greater than 0.3 with the first character prediction region, into a candidate set S2, and meanwhile deleting these character prediction regions from the character region set S1;

step 609, sorting the character prediction regions in the candidate set S2 according to the classification confidences in a descending order, retaining the two character prediction regions which have the two highest classification confidences, and removing the rest of the character prediction regions;

step 610, judging whether differences between the classification confidences of the character prediction regions in the candidate set S2 are smaller than 0.1, wherein if not, step 611 is performed; and if yes, step 612 is performed;

step 611, placing the character prediction region having a higher classification confidence in the candidate set S2 into the character position set S3, setting the candidate set S2 as an empty set, and returning to step 605;

step 612, placing the character prediction region having a larger area in the candidate set S2 into the character position set S3, setting the candidate set S2 as an empty set, and returning to step 605; and step 613, outputting the character categories of the character prediction regions in the character position set S3 according to the abscissas of the character prediction regions in an ascending order.

Figure 7:
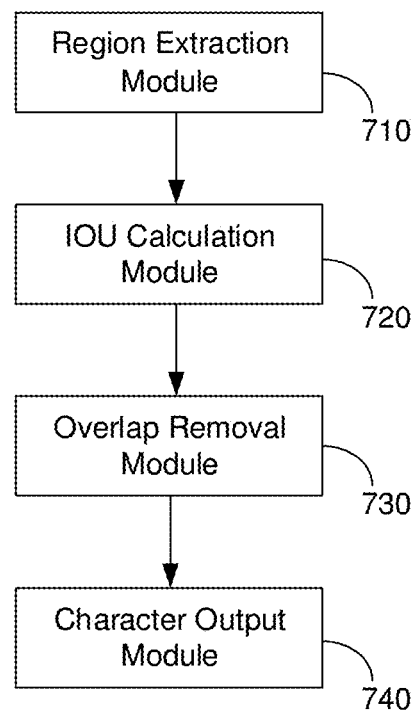
FIG. 7 is a block diagram of a text recognition apparatus provided in an embodiment of the present disclosure.

FIG. 7 is a block diagram of a text recognition apparatus provided in an embodiment of the present disclosure, wherein the apparatus includes: a region extraction module 710, an IOU calculation module 720, an overlap removal module 730 and a character output module 740.

The region extraction module 710 is configured to extract character prediction regions of a text line image using a constructed text recognition model, to obtain a character region set.

The IOU calculation module 720 is configured to calculate horizon-distance IOUs between the character prediction regions in the character region set according to a position of each character prediction region in the character region set.

The overlap removal module 730 is configured to remove overlapped character prediction regions in the character region set, according to the horizon-distance IOUs between the character prediction regions in the character region set, to obtain a character position set.

The character output module 740 is configured to sort and output character categories corresponding to the character prediction regions in the character position set according to positions of the character prediction regions in the character position set.

For implementation processes of functions and effects of various modules in the above apparatus, implementation processes of corresponding steps in the above text recognition method may be specifically referred to, which will not be repeatedly described in detail herein.

Figure 8:
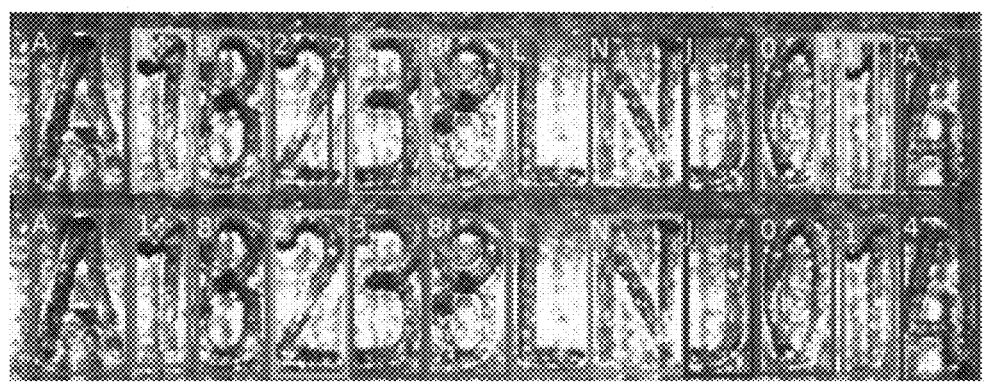
FIG. 8 is a graph for comparing effects before and after screening overlapping prediction boxes based on a horizon-distance IOU.
Figure 9:
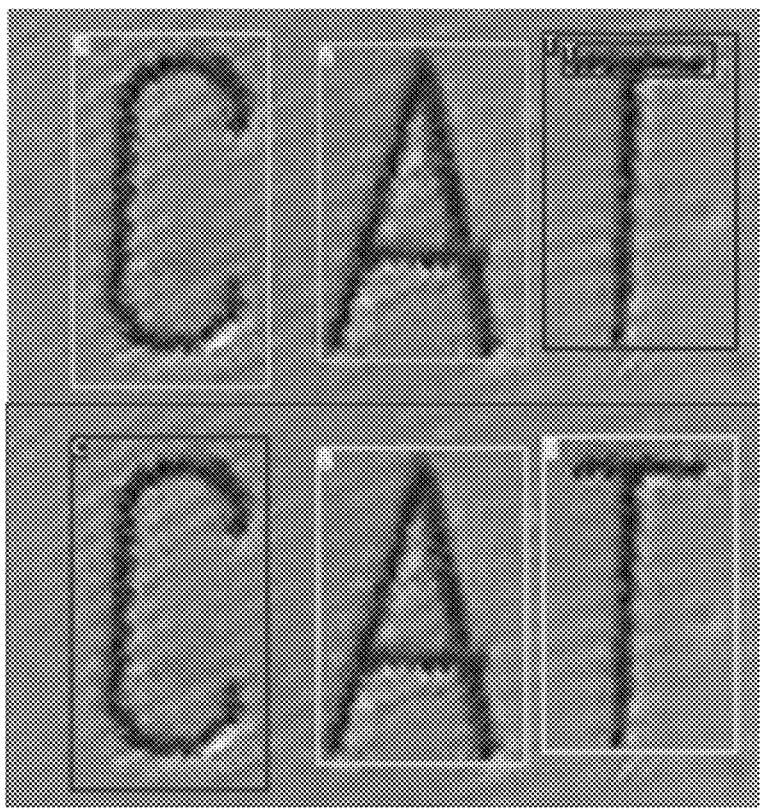
FIG. 9 is a graph for comparing processing effects using a horizon-distance IOU and effects using an area IOU.

FIG. 8 is a graph for comparing effects before and after screening overlapping prediction boxes based on the horizon-distance IOU, wherein a first line represents a text recognition effect obtained without performing screening based on the horizon-distance IOU, and a second line represents a text recognition effect after performing screening based on the horizon-distance IOU. A third digit 0 can be seen in FIG. 8, but as there are overlapping prediction boxes in the first line, two digits 0 are identified, then the detection is not accurate enough. FIG. 9 is a graph for comparing processing effects using the horizon-distance IOU and an area IOU. In FIG. 9, a first line in the image represents a processing result after performing screening of overlapping prediction boxes based on the area IOU, and a second line represents a processing result after performing the screening of overlapping prediction boxes based on the horizon-distance IOU. It can be seen that a problem that a plurality of character prediction boxes appear at the same position while the area IOU does not exceed the threshold value can be resolved based on the horizon-distance IOU, which, however, cannot be handled by the conventional method based on the area IOU.

In the technical solution provided in the embodiments of the present disclosure, compared with the text recognition method based on segmentation, the text recognition algorithm based on target detection provided in the embodiments of the present disclosure is not based on pixel-level prediction, so that the speed is higher, and the robustness to noise is improved; the processing mode for performing the screening of the overlapping character boxes based on the horizon-distance IOU can solve the problem of character box overlapping in text recognition using target detection, and meanwhile, this method involves quite little calculation, much less than that of the existing NMS. The technical solution provided in the embodiments of the present disclosure is applicable to recognition for warp (bent) texts, and can resolve the problem that a plurality of character boxes appear at the same position but the area IOU does not exceed the threshold value. For example, the area IOU is generally too large in warp texts, and if the method based on the area IOU is adopted instead of the method based on the horizon-distance IOU proposed in the embodiments of the present disclosure, correct character prediction boxes may be easily filtered out, thus leading to a post-processing error.

In the several embodiments provided in the present disclosure, the apparatus and the method disclosed also can be implemented in other modes. The apparatus embodiment described above is merely exemplary, for example, the flowchart and the blocks in the accompanying drawings illustrate possible system architectures, functions and operations of the apparatus, method and computer program products according to multiple embodiments of the present disclosure. In this regard, each block in the flowchart or the block may represent a part of one module, program segment or code, and the part of the module, the program segment, or the code contains one or more executable instructions configured to achieve a specified logical function. In some optional embodiments, functions marked in the blocks also can occur in an order different from that marked in the accompanying drawings. For example, two continuous blocks practically can be executed substantially in parallel, and they sometimes also may be executed in a reverse order, which depends upon a function involved. It also should be noted that each block in the block diagram and/or the flowchart, and combinations of the blocks in the block diagram and/or the flowchart can be realized by a dedicated hardware-based system configured to execute a specified function or action, or can be realized by a combination of dedicated hardware and computer instructions.

Besides, various functional modules in various embodiments of the present disclosure can be integrated with each other to form one independent portion, and it is also possible that various modules exist independently, or that two or more modules are integrated to form one independent part.

If the function is realized in a form of software functional module and is sold or used as an individual product, it may be stored in one computer readable storage medium. Based on such understanding, the technical solutions in essence or parts making contribution to the prior art or parts of the technical solutions of the present disclosure can be embodied in form of a software product, and this computer software product is stored in a storage medium, including several instructions for making one computer device (which can be a personal computer, a server or a network device etc.) execute all or part of the steps of the methods of various embodiments of the present disclosure. The aforementioned storage medium includes various media in which program codes can be stored, such as U disk, mobile hard disk, read-only memory (ROM), random access memory (RAM), diskette and compact disk.

What is claimed is:

1. A text recognition method, comprising steps of:
    extracting character prediction regions of a text line image using a constructed text recognition model, to obtain a character region set;
    calculating horizon-distance IOUs (Intersection Over Union) between the character prediction regions in the character region set according to a position of each character prediction region in the character region set;
    removing overlapped character prediction regions from the character region set, according to the horizon-distance IOUs between the character prediction regions in the character region set, to obtain a character position set; and
    sorting and outputting, according to positions of the character prediction regions in the character position set, character categories corresponding to the character prediction regions in the character position set.

2. The method according to claim 1, wherein the step of extracting character prediction regions of a text line image using a constructed text recognition model to obtain a character region set comprises:
    inputting the text line image into the constructed text recognition model, to obtain character prediction regions output by the text recognition model and a classification confidence corresponding to each character prediction region; and
    performing non-maximum suppression on each character prediction region according to the classification confidence corresponding to the character prediction region, to obtain the character region set.

3. The method according to claim 2, wherein after the step of performing non-maximum suppression on each character prediction region to obtain the character region set, the method further comprises:
    screening out from the character region set a character prediction region having the classification confidence greater than a first threshold value, to reconstruct the character region set.

4. The method according to claim 1, wherein the step of calculating a horizon-distance IOU between the character prediction regions in the character region set according to a position of each character prediction region in the character region set comprises:
    sorting the character prediction regions in the character region set according to an abscissa of each character prediction region in the character region set; and
    calculating, for each character prediction region, the horizon-distance IOUs between the character prediction region and the other character prediction regions in the character region set in sequence.

5. The method according to claim 1, wherein the step of removing overlapped character prediction regions from the character region set, according to the horizon-distance IOUs between the character prediction regions in the character region set to obtain a character position set comprises:

for each character prediction region in the character region, placing the character prediction region set into the character position set if all the horizon-distance IOUs between the character prediction and all the other character prediction regions in the character region set are less than or equal to the second threshold value.

6. The method according to claim 1, wherein the step of removing overlapped character prediction regions from the character region set according to the horizon-distance IOUs between the character prediction regions in the character region set to obtain a character position set comprises:

for each character prediction region in the character region set, if the horizon-distance IOU between the character prediction region set and at least one character prediction region in the character region set is greater than the second threshold value, removing the current character prediction region and the at least one character prediction region from the character region set, and placing the current character prediction region and the at least one character prediction region in a candidate set; and selecting and adding a character prediction region to the character position set according to classification confidence of each character prediction region in the candidate set.

7. The method according to claim 6, wherein the step of selecting and adding a character prediction region to the character position set according to classification confidence of each character prediction region in the candidate set comprises:

screening out two character prediction regions having two highest classification confidences according to the classification confidence of each character prediction region in the candidate set; and adding, if the difference between the classification confidences of the two character prediction regions is smaller than a third threshold value, the character prediction region having a larger area between the two character prediction regions, into the character position set.

8. The method according to claim 7, wherein after the step of screening out two character prediction regions having two highest classification confidences according to the classification confidence of each character prediction region in the candidate set, the method further comprises:

adding, if the difference between the classification confidences of the two character prediction regions is greater than or equal to the third threshold value, the character prediction region having a larger classification confidence between the two character prediction regions, into the character position set.

9. An electronic device, comprising:
a processor; and
a memory, configured to store instructions executable by the processor,
wherein the processor is configured to execute the text recognition method according to claim 1.

10. The electronic device according to claim 9, wherein the processor is further configured to execute the following:

inputting the text line image into the constructed text recognition model, to obtain character prediction regions output by the text recognition model and a classification confidence corresponding to each character prediction region; and performing non-maximum suppression on each character prediction region according to the classification confidence corresponding to the character prediction region, to obtain the character region set.

11. The electronic device according to claim 10, wherein the processor is further configured to execute the following:

screening out from the character region set a character prediction region having the classification confidence greater than a first threshold value, to reconstruct the character region set.

12. The electronic device according to claim 9, wherein the processor is further configured to execute the following:

sorting the character prediction regions in the character region set according to an abscissa of each character prediction region in the character region set; and calculating, for each character prediction region, the horizon-distance IOUs between the character prediction region and the other character prediction regions in the character region set in sequence.

13. The electronic device according to claim 9, wherein the processor is further configured to execute the following:

for each character prediction region in the character region, placing the character prediction region set into the character position set if all the horizon-distance IOUs between the character prediction and all the other character prediction regions in the character region set are less than or equal to the second threshold value.

14. The electronic device according to claim 9, wherein the processor is further configured to execute the following:

for each character prediction region in the character region set, if the horizon-distance IOU between the character prediction region set and at least one character prediction region in the character region set is greater than the second threshold value, removing the current character prediction region and the at least one character prediction region from the character region set, and placing the current character prediction region and the at least one character prediction region in a candidate set; and selecting and adding a character prediction region to the character position set according to classification confidence of each character prediction region in the candidate set.

15. The electronic device according to claim 14, wherein the processor is further configured to execute the following:

screening out two character prediction regions having two highest classification confidences according to the classification confidence of each character prediction region in the candidate set; and adding, if the difference between the classification confidences of the two character prediction regions is smaller than a third threshold value, the character prediction region having a larger area between the two character prediction regions, into the character position set.

16. The electronic device according to claim 15, wherein the processor is further configured to execute the following:

adding, if the difference between the classification confidences of the two character prediction regions is greater than or equal to the third threshold value, the character prediction region having a larger classification confidence between the two character prediction regions, into the character position set.

17. A text recognition apparatus, comprising:
- a region extraction module, configured to extract character prediction regions of a text line image using a constructed text recognition model, to obtain a character region set;
- an IOU calculation module, configured to calculate horizon-distance IOUs between the character prediction regions in the character region set according to a position of each character prediction region in the character region set;
- an overlap removal module, configured to remove overlapped character prediction regions from the character region set, according to the horizon-distance IOUs between the character prediction regions in the character region set, to obtain a character position set; and
- a character output module, configured to sort and output character categories corresponding to the character prediction regions in the character position set according to positions of the character prediction regions in the character position set.

* * * * *